United States Patent
Makarskyy et al.

(10) Patent No.: US 11,063,762 B1
(45) Date of Patent: Jul. 13, 2021

(54) COMPUTING SYSTEM FOR INTER-APPLICATION COMMUNICATION

(71) Applicant: Allscripts Software, LLC, Raleigh, NC (US)

(72) Inventors: Stanislav Makarskyy, Arlington Heights, IL (US); Igor Chmil, Buffalo Grove, IL (US); Mark Plunkett, Libertyville, IL (US); Ethan O'Brien, Raleigh, NC (US); Sayeebalaji Chandrasekaran, Morrisville, NC (US)

(73) Assignee: Allscripts Software, LLC, Raleigh, NC (US)

( * ) Notice: Subject to any disclaimer, the term of this patent is extended or adjusted under 35 U.S.C. 154(b) by 388 days.

(21) Appl. No.: 15/902,730

(22) Filed: Feb. 22, 2018

(51) Int. Cl.
*H04L 9/32* (2006.01)
*G06F 9/54* (2006.01)
*H04L 9/08* (2006.01)
*H04L 29/06* (2006.01)

(52) U.S. Cl.
CPC .......... *H04L 9/3213* (2013.01); *G06F 9/547* (2013.01); *H04L 9/0819* (2013.01); *H04L 9/0861* (2013.01); *H04L 63/08* (2013.01)

(58) Field of Classification Search
CPC ... H04L 9/3213; H04L 9/0861; H04L 9/0819; H04L 63/08; G06F 9/547
See application file for complete search history.

(56) References Cited

U.S. PATENT DOCUMENTS

| | | | |
|---|---|---|---|
| 6,915,457 B1* | 7/2005 | Miller | G06F 11/3495 370/244 |
| 8,225,093 B2 | 7/2012 | Fok et al. | |
| 9,563,764 B2* | 2/2017 | Um | G06F 21/44 |
| 10,121,141 B1* | 11/2018 | Belleville | G06Q 20/3672 |
| 2002/0059517 A1 | 5/2002 | Haviv et al. | |
| 2005/0216422 A1* | 9/2005 | Lotspiech | H04L 9/32 705/66 |
| 2011/0231921 A1* | 9/2011 | Narayanan | G06F 21/604 726/9 |

(Continued)

*Primary Examiner* — Khoi V Le
(74) *Attorney, Agent, or Firm* — Medley, Behrens & Lewis, LLC

(57) ABSTRACT

A computing system for inter-application communication between a client emitter application and a client consumer application executing on a mobile computing device is disclosed herein. The client emitter application receives an indication of a programmatic task to be performed by the client consumer application. The client emitter application transmits data to a server emitter application executing on a first server computing device causing a session token to be generated, the session token indicating that a server consumer application executing on a second server computing device has authenticated the client emitter application. The server emitter application forwards the session token to the client emitter application. The client emitter application includes the session token in a call indicative of the programmatic task to the client consumer application. The client consumer application and the server consumer application authenticate the client emitter application and the client consumer application, respectively, based on the session token. The client consumer application then performs the programmatic task.

18 Claims, 6 Drawing Sheets

(56) References Cited

U.S. PATENT DOCUMENTS

| | | | | |
|---|---|---|---|---|
| 2014/0298420 A1* | 10/2014 | Barton | .................... | H04L 63/10 |
| | | | | 726/4 |
| 2015/0040246 A1* | 2/2015 | Yuen | ................ | H04W 12/0023 |
| | | | | 726/30 |
| 2017/0169433 A1* | 6/2017 | De Magalhaes | ...... | H04L 63/105 |

* cited by examiner

US 11,063,762 B1

COMPUTING SYSTEM FOR INTER-APPLICATION COMMUNICATION

BACKGROUND

Electronic health records applications (EHRs) are robust applications that are utilized in medical facilities across a variety of aspects of a medical practice. EHRs are configured with functionality pertaining to patient intake, patient billing, insurance billing, prescription generation, maintaining a record of patient care over time, etc. EHRs are often used by healthcare workers at the point of care (i.e., at a time when the healthcare worker is providing care to a patient). For example, a client EHR executing on a mobile computing device may receive input from a healthcare worker that causes a server-side EHR to retrieve data from a patient record and present the data to the healthcare worker.

A conventional EHR is often configured with modules dedicated to certain functions which enable the EHR to perform the functions. For instance, a conventional EHR may include a module for generating an electronic prescription, a module for obtaining authorization for the electronic prescription from an insurance company, a module for transmitting the electronic prescription to a pharmacy, etc.

Recently, new EHRs have been developed with new architectures that differ significantly from conventional EHR architectures. These new architectures tend to preclude the inclusion of modules into the EHR. Thus, in order to enable a new EHR to have the same functionality as a conventional EHR, the new EHR (or new client EHR) may have to exchange sensitive data (e.g., patient health data) with an application that is external to the new EHR (or new client EHR). For example, a new client EHR executing on a mobile computing device may have to exchange sensitive data (e.g., protected patient health data) with another application also executing on the mobile computing device.

Exchanging data between applications executing on a mobile computing device can come with security risks. For example, a malicious application may be inadvertently installed on the mobile computing device which can intercept data transferred between the applications. In another example, a malicious application can access functionality of an application by performing an unauthorized programmatic call to the application.

Conventionally, there are three approaches used to transfer data between applications executing on a mobile computing device. In a first approach, a third-party application (sometimes referred to as a "broker") tasked with providing secure transfer of data between applications may be installed on the mobile computing device. The broker application acts as an intermediary between applications and provides for exchange of data between the applications. While broker applications are commonly used, it is highly undesirable to install a third-party application on the mobile computing device and to expose patient health data to the third-party application. In a second approach, the applications may employ a common security subsystem using a common set of keys for encryption and decryption between applications. However, this approach requires that the applications be developed in tandem by a common developer which is often not practical. In a third approach, the applications may both utilize a shared, secured storage area of the operating system of the mobile computing device to store access credentials. This approach is also problematic as it requires exposing patient health data to the operating system of the mobile computing device. Thus, none of these approaches provide sufficient security for transferring patient health data between applications executing on a mobile computing device.

SUMMARY

The following is a brief summary of subject matter that is described in greater detail herein. This summary is not intended to be limiting as to the scope of the claims.

Described herein are various technologies related to inter-application communication between applications executing on a mobile computing device. More specifically, the technologies described herein enable a client emitter application executing on a mobile computing device to securely transfer data to a client consumer application also executing on the mobile computing device.

The client emitter application executing on the mobile computing device receives an indication of a programmatic task to be performed by the client consumer application that also executes on the mobile computing device. Responsive to receiving the indication, the client emitter application transmits an emitter-device identifier and user metadata to a server emitter application executing on a first server computing device that is in network communication with the mobile computing device. The emitter-device identifier identifies the mobile computing device executing the client emitter application and the user metadata is a set of attributes for a user of the mobile computing device identifying the user in an organization.

The server emitter application causes a session token to be generated based upon the emitter-device identifier and the user metadata. The session token indicates that the emitter-application has been authenticated by a server consumer application executing on a second server computing device that is in network communication with the mobile computing device. The first server computing device and the second server computing device are also in network communication. The server emitter application additionally causes the first server computing device to transmit the session token to the mobile computing device, whereupon the session token is received by the client emitter application.

Responsive to receiving the session token from the server emitter application, the client emitter application performs a call to the client consumer application. The call comprises the session token and is indicative of the programmatic task. The call may also comprise patient data for a patient (e.g., protected patient health data). The client consumer application then authenticates the client emitter application based on the session token. Responsive to the client consumer application authenticating the client emitter application, the server consumer application authenticates the client consumer application based on the session token. Responsive to authentication of the client consumer application by the server consumer application, the client consumer application performs the programmatic task.

The above-described technologies enable the client emitter application to securely exchange data (e.g., patient data) with the client consumer application. Moreover, the above-described technologies do not require the use of a third-party application (broker), the use of a common security subsystem, or exposing the data itself to an operating system of a mobile computing device. Thus, the above-described technologies are well-suited for securely transferring protected patient health data between applications executing on the mobile computing device.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
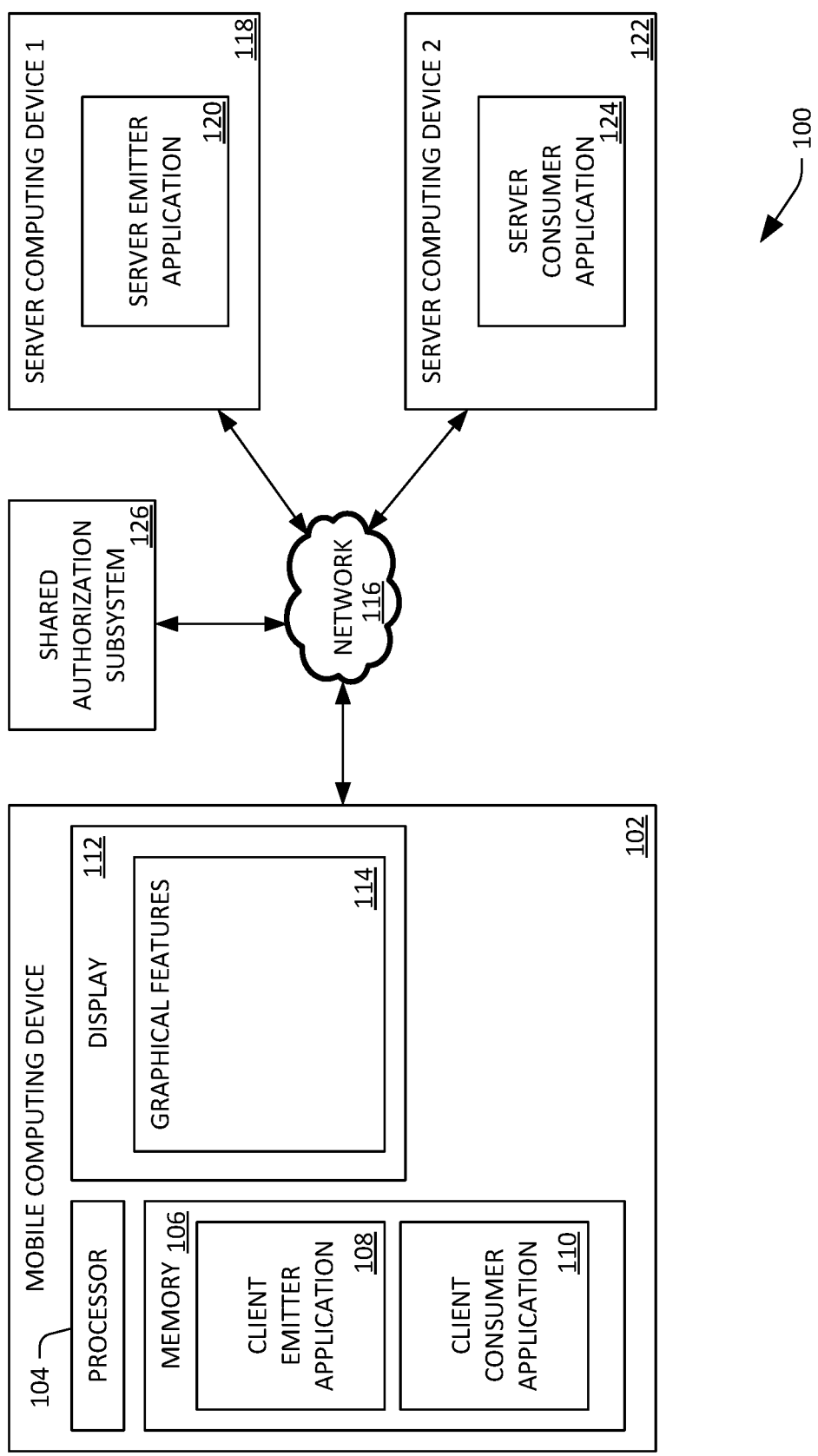
FIG. 1 is a functional block diagram of an exemplary computing system that is configured to facilitate inter-application communication between applications executing on a mobile computing device.

Various technologies pertaining to inter-application communication on a mobile computing device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference to FIG. 1, an exemplary computing system 100 that facilitates inter-application communication is illustrated. The computing system 100 includes a mobile computing device 102. In a non-limiting example, the mobile computing device 102 can be a tablet computing device or a smartphone. The mobile computing device 102 comprises a processor 104 and memory 106, wherein the memory 106 has a client emitter application 108 and a client consumer application 110 loaded therein. In an example, the client emitter application 108 can be a client EHR application and the client consumer application 110 can be a prescription generation application. The mobile computing device 102 may also include a display 112, wherein graphical features 114 can be presented thereon. The mobile computing device 102 may also include components suitable for data input (not shown), such as a touchscreen, mouse, keyboard, microphone, camera, video camera, etc.

The computing system 100 may further include a first server computing device 118 and a second server computing device 122. The first server computing device 118, the second server computing device 122, and the mobile computing device 102 are in communication by way of a network 116 (e.g., the Internet, intranet, etc.). The first server computing device 118 comprises a processor and memory (not shown), wherein the memory includes a server emitter application 120 for the client emitter application 108. The second server computing device 122 comprises a processor and memory (not shown), wherein the memory includes a server consumer application 124 for the client consumer application 110. The first server computing device 118 and the second server computing device 122 may also comprise data stores (not shown). The server emitter application 120 is tasked with communicating with the client emitter application 108 and the server consumer application 124. The server consumer application 124 is tasked with communicating with the client consumer application 110 and the server emitter application 120.

While the server emitter application 120 and the server consumer application 124 have been described as executing on separate server computing devices, it is understood that in some embodiments the server emitter application 120 and the server consumer application 124 may execute on the same computing server computing device.

The computing system 100 may also include a shared authorization subsystem 126 in communication with the first server computing device 118 and the second server computing device 122 by way of the network 116. The shared authorization subsystem 126 may aid in the authenticating process described below by supporting authorization and authentication operations such as via Security Assertion Markup Language (SAML) or OAuth. It is to be understood that the shared authorization subsystem 126 is optional and that the functionality described herein can be accomplished without the use of the shared authorization subsystem 126.

Figure 2:
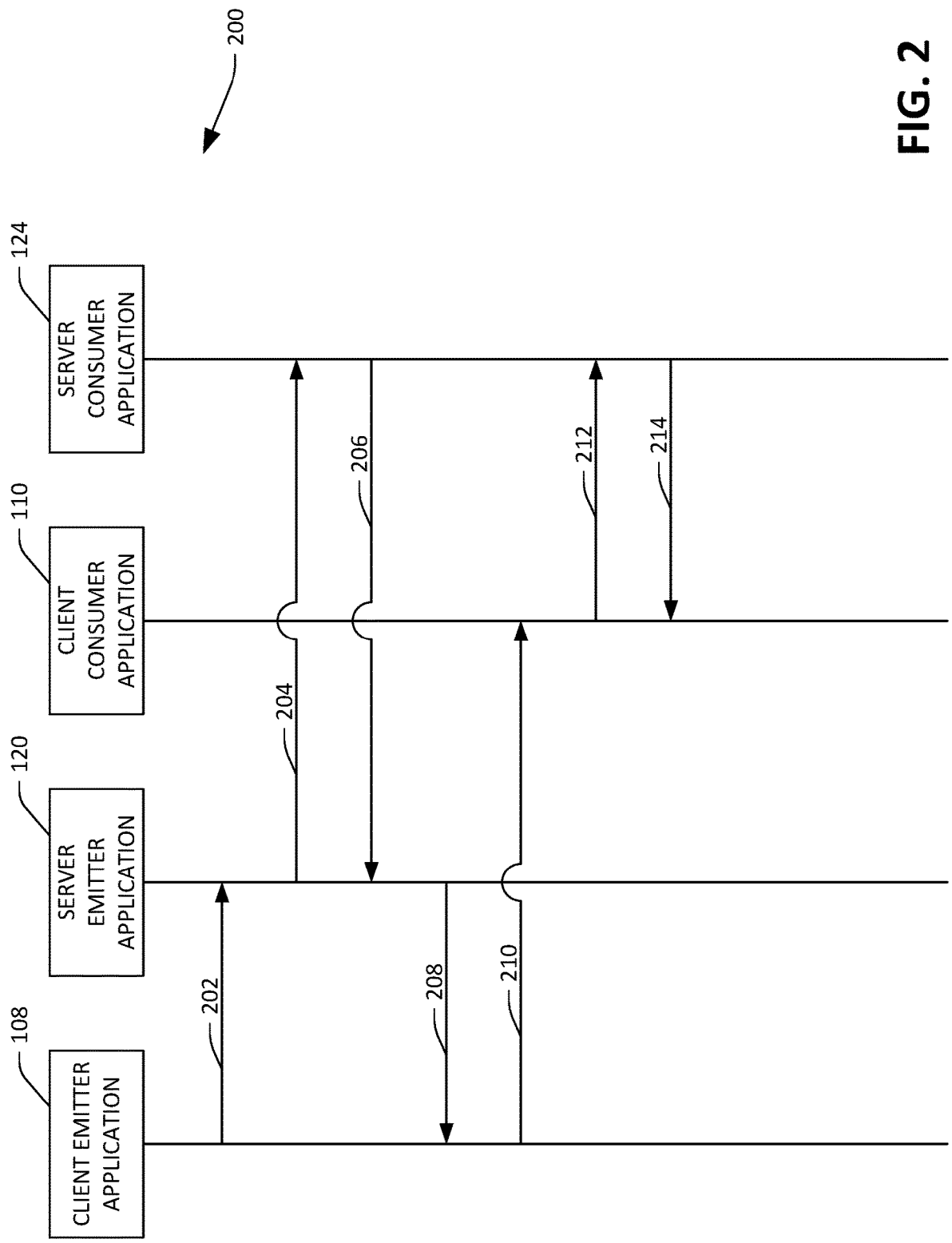
FIG. 2 illustrates a control flow diagram for registering a client emitter application and a client consumer application for inter-application communication.
Figure 3:
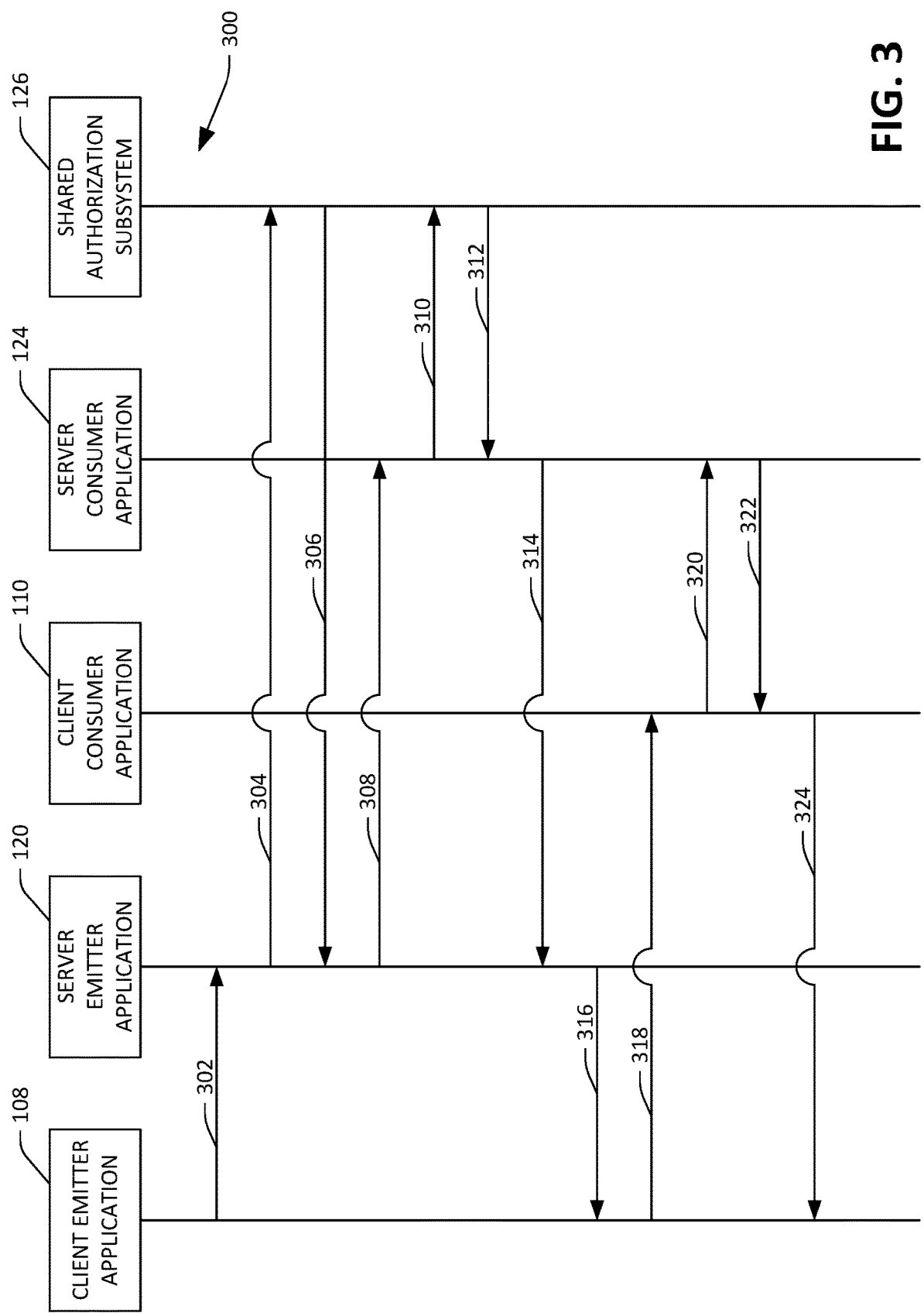
FIG. 3 illustrates a control flow diagram for inter-application communication between a client emitter application and a client consumer application.

FIGS. 2 and 3 are control flow diagrams that illustrate operation of the computing system 100. While the control flow diagrams are shown and described as being a series of steps that are performed in a sequence, it is to be understood and appreciated that the operation of the computing system 100 is not limited by the order of the sequence. For example, some steps can occur in a different order than what is described herein. In addition, a step can occur concurrently with another act. Further, in some instances, not all steps may be required in the operation of the computing system 100 described herein.

Referring now to FIG. 2, an exemplary control flow diagram 200 for registering the client emitter application 108 and the client consumer application 110 is illustrated. At 202, the client emitter application 108 may receive input via a user interface of the client emitter application 108 causing the client emitter application 108 to transmit an emitter-device identifier and user metadata for a user to the server emitter application 120. The emitter-device identifier identifies the mobile computing device 102 executing the client emitter application 108. The user metadata is a set of attributes that identifies a user of the mobile computing device 102 within an organization. For instance, the user metadata may include an identifier for an organization of the user, an identifier for a vendor of the client emitter application 108 and/or the client consumer application 110, an identifier for a practice group of a user within an organization, etc. The client emitter application 108 may also transmit a callback to the server emitter application 120 along with the emitter-device identifier. The callback is a string that is indicative of a programmatic task to be performed by the client consumer application 110 after the client consumer application 110 performs another programmatic task. For instance, the callback may be executed by the client consumer application 110 causing program control to be returned to the client emitter application 108.

Responsive to receiving the emitter-device identifier and the user metadata (and optionally, the callback), the server emitter application 120 may retrieve an emitter-application identifier from a third server computing device (not shown) that is configured to retain identifier for applications that are able to be installed on mobile computing devices. In an embodiment, the emitter-application identifier may already be present in a data store of the first server computing device 118 and hence the server emitter application 120 need not retrieve the emitter-application identifier. The emitter-application identifier identifies the client emitter application 108 and is a different identifier than the emitter-device identifier. In an embodiment, the emitter-application identifier may be provided by an operating system of the mobile computing device 102. At 204, the server emitter application 120 then transmits the emitter-device identifier, the emitter-application identifier, the user metadata, and optionally the callback to the server consumer application 124 (collectively referred to as "the registration attributes"). The server consumer application 124 may verify that the client emitter application 108 has not already been registered using the registration attributes by executing a search over registration attributes for a plurality of mobile devices based on the emitter-device identifier. In the event that the search indicates that client emitter application 108 is already registered, the server consumer application 124 will transmit a message to the server emitter application indicating that registration has already been completed. The server emitter application 120 may then forward the message to the client emitter application 108 and the registration process will terminate.

After verifying that the client emitter application 108 does not have a valid registration, the server consumer application 124 stores the registration attributes in a data store accessible to the server consumer application 124. The server consumer application 124 also generates a registration key based on at least a portion of the registration attributes. The registration key may comprise a public portion and a private portion. The public portion of the registration key may include the emitter-application identifier. The private portion of the registration key may include an encrypted version of the emitter-application identifier (an "encrypted emitter-application identifier") that has been encrypted by the server consumer application 124. The private portion of the registration key may also include a pointer to a location in the data store where the registration attributes are stored.

At 206, the server consumer application 124 transmits the registration key to the server emitter application 120. At 208, the server consumer application 124 forwards the registration key to the client emitter application 108. At 210, the client emitter application 108 performs a registration call to the client consumer application 110. The registration call includes the registration key and the emitter-application identifier. The client consumer application 110 then validates the client emitter application 108 by confirming that the emitter-application identifier in the call and the emitter-application identifier in the public portion of the registration key match.

At 212, responsive to validating the client emitter application 108, the client consumer application 110 transmits the registration key and a consumer-device identifier to the server consumer application 124. The consumer-device identifier identifies the mobile computing device 102 executing the client consumer application 110. Responsive to receiving the registration key and the consumer-device identifier, the server consumer application 124 validates the registration key by comparing the public and private portions of the registration key to the registration attributes stored in the data store (described above). Responsive to validating the registration key, the server consumer application 124 stores the consumer-device identifier along with the registration attributes in the data store such that the consumer-device identifier is now included in the registration attributes in the data store. The server consumer application 124 may also generate a salt to be included and stored with the registration attributes.

The server consumer application 124 may then generate secret data from the registration attributes using a cryptographic function. The secret data itself is not stored in the data store. However, since the registration attributes are stored in the data store, the server consumer application 124 can regenerate the secret data from the registration attributes stored in the data store at a later time using the cryptographic function. At 214, the server consumer application 124 transmits the secret data to the client consumer application 110. The client consumer application 110 stores the secret data in a secure memory location on the mobile computing device 102. The secret data may be indexed by the emitter-application identifier such that the client consumer application 110 may retrieve the secret data based on the emitter-application identifier. The client consumer application 110 may then present a message to a user of the mobile computing device 102 that the client emitter application 108 and the client consumer application 110 have been registered.

Registration of the client emitter application 108 and the client consumer application 110 may be valid for 10 to 180 days. For instance, the registration may be valid for 20 to 150 days, 40 to 110 days, or 90 to 100 days. After registration expires, the above-described process can be repeated in order to re-register the client emitter application 108 and the client consumer application 110. Thus, it is to be understood that the registration attributes may also include a time range for which the registration is valid. Furthermore, it is to be understood that the registration key may be single-use.

Turning now to FIG. 3, an exemplary control flow diagram 300 for inter-application communication after the client emitter application 108 and the client consumer application 110 are registered (described above in the description of FIG. 2) is illustrated. At 302, responsive to receiving an indication of a programmatic task to be performed by the client consumer application 110, the client emitter application 108 transmits the emitter-device identifier and the user metadata (described above) to the server emitter application 120. As used herein, the term "programmatic task" refers to one or more computer-executable instructions that are executed by a processor of a computing device that cause the processor perform one or more actions. In an example, the programmatic task may include the client consumer application 110 generating an electronic prescription using patient health data received from the client emitter application 108. The client emitter application 108 may also transmit patient data for a patient along with the emitter-device identifier. For instance, the patient data may include protected patient health information for the patient. Responsive to receiving the emitter-device identifier and the user metadata, the server application 120 then retrieves the emitter-application identifier (described above).

Steps 304-316 cause a session token to be generated and received by the client emitter application 108. At 304, the server emitter application 120 transmits a request for an emitter token to the shared authorization subsystem 126. The request includes the user metadata and a data context. The data context may include a token (e.g., a Security Assertion Markup Language (SAML) token) generated by the server emitter application 120 in an embodiment where the shared authorization subsystem is configured to receive tokens generated by the server emitter application 120. Responsive to receiving the request, the shared authorization subsystem 126 generates an emitter token. The emitter token may include assertions, the user metadata, and the data context. The assertions may be used by the server consumer application 124 in order to verify the identity of the user. At 306, the shared authorization subsystem 126 transmits the emitter token to the server emitter application 120.

In an embodiment, the server emitter application 120 may generate the emitter token without the use of the shared authorization subsystem 126. For instance, the server emitter application 120 may utilize a local identity provider (local idP) and/or a trusted certificate in order to generate the emitter token. More specifically, the server emitter application 120 can generate the emitter token using the local idP and sign the emitter token using the trusted certificate. The server consumer application 124 can then be configured to trust the trusted certificate used to generate the emitter token. Thus, it can be ascertained that steps 304 and 306 are optional.

At 308, responsive to receiving (or generating) the emitter token, the server emitter application 120 transmits the emitter token, the user metadata, the emitter-device identifier, and the emitter-application identifier to the server consumer application 124. In an embodiment, the emitter token, the user metadata, the emitter-device identifier, and the emitter-application identifier may be transmitted in SAML format. Responsive to receiving the emitter token, the user metadata, the emitter-device identifier, and the emitter-application identifier, the server consumer application 124 validates the emitter-device identifier and the emitter-application identifier against the emitter-device identifier and the emitter-application identifier stored in the data store (as part of the registration data, described above). The server consumer application 124 may also verify that the registration for the client emitter application 108 has not expired by reading a time range included in the registration data. In the event that registration for the client emitter application 108 has expired, the server consumer application 124 will transmit a message to the server emitter application 120 indicating that re-registration of the client emitter application 108 is required. The server emitter application 120 will then forward the message to the client emitter application 108, and the client emitter application 108 can begin the registration process described above in FIG. 2. The server consumer application 124 also validates the assertions in the emitter token using the user metadata.

At 310, the server consumer application 124 may transmit the emitter token to the shared authorization subsystem 126. The shared authorization subsystem 126 then authenticates the emitter token. At 312, responsive to authenticating the emitter token, the shared authorization subsystem 126 transmits the emitter token back to the server consumer application 124. As mentioned previously, use of the shared authorization subsystem 126 is optional. Thus, it can be ascertained that steps 310 and 312 are optional.

Responsive to receiving (authenticated) emitter token from the shared authorization subsystem 126, the server consumer application 124 regenerates the secret data using the registration attributes stored in the data store by applying the same cryptographic function to the registration attributes used in the registration process described above. The server consumer application 124 then generates a session token comprising a public portion and a private portion. The public portion includes the emitter-application identifier. The private portion includes an encrypted version of the emitter-application identifier that is encrypted by the server consumer application 124 using the secret data. The session token may additionally include a signature from the server consumer application 124, wherein the signature identifies the server consumer application 124. In an embodiment, the session token may be wrapped in Extensible Markup Language (XML). The session token may be valid for a relatively short time range, such as 1 to 5 minutes. For example, the session token may be valid for 1.5 to 4.5 minutes, 2 to 4 minutes, or 3 to 3.5 minutes. In the event that the session token is not used by the client emitter application 108 and/or the client consumer application 110 (described below) within the time range, steps 302-316 may be repeated in order to regenerate the session token.

At 314, responsive to generating the session token, the server consumer application 124 transmits the session token to the server emitter application 120. At 316, the server emitter application 120 then forwards the session token to the client emitter application 108.

At 318, responsive to receiving the session token, the client emitter application 108 performs a programmatic call indicative of the programmatic task to the client consumer application 110. The call includes the session token. The call may also include the emitter-application identifier (separate from the emitter-application identifier in the public portion of the session token). In an embodiment, the call may also include patient data for a patient. Responsive to receiving the call, the client consumer application 110 validates the public portion of the session token (i.e., the emitter-application identifier) against the (separate) emitter-application identifier also included in the call. After validating the public portion of the session token, the client consumer application 110 retrieves the secret data from the secure memory location using the public portion of the session token (i.e., the emitter-application identifier). As the private portion of the session token was previously encrypted by the server consumer application 124 using the secret data, the client consumer application 110 may decrypt the private portion of the session token using the secret data stored in the secure memory location in order to generate a decrypted session token. Responsive to decrypting the private portion of the session token, the client consumer application 110 validates the emitter-application identifier in the public part of the session token against the emitter-application identifier in the now decrypted private portion of the session token. The client consumer application 110 may also validate the signature of the server consumer application 124 in the decrypted session token using the secret data. For instance, in an embodiment, the client consumer application 110 may validate the signature against an arbitrary security certificate that is accessible to the client consumer application 110.

At 320, the client consumer application 110 requests a session access token from the server consumer application 124 by transmitting the decrypted session token, the emitter-device identifier, and the emitter-application identifier to the server consumer application 124. The server consumer application 124 then validates the registration attributes stored during the registration process (described above) against at least the emitter-device identifier and the emitter-application identifier. The server consumer application 124 also validates the signature of the server consumer application 124 in the decrypted session token using the registration attributes. Responsive to validating the registration attributes and the signature, the server consumer application 124 then generates a session access token. The session access token indicates that the server consumer application 124 has authenticated the client consumer application 110 as well as the client emitter application 108. The session access token may be valid for a short time range, such as 5 to 30 minutes. For example, the session access token may be valid from 7.5 to 25 minutes, 10 to 20 minutes, or 13 to 15 minutes. In the event that the session access token is not used by the client consumer application 110 within the time range, steps 302-316 may be repeated in order to regenerate the session access token. At 322, the server consumer application 124 transmits the session access token to the client consumer application 110. Responsive to receiving the session access token, the client consumer application 110 then performs the programmatic task indicated by the call. At 324, the client consumer application 110 executes the callback which causes the client consumer application 110 to perform the programmatic task indicated by the callback.

It is to be understood that the emitter token, the session token, and the session access token described above may be valid only for a single use. More specifically, once a token is used in one the previously mentioned steps, one or more of the applications described above may mark the token as being used, and the same token may not be used again in a step that has previously been performed. For example, after the client consumer application 110 performs the programmatic task responsive to receiving the session access token from the server consumer application 124, the client consumer application 110 may not perform the programmatic task a second time using the same session access token. Instead, in order for the client consumer application 110 to perform the programmatic task a second time, a new session access token will need to be generated by the computing system 100 using the above-described processes.

The technologies described herein present various advantages over conventional technologies used to transfer data between applications executing on a mobile computing device. First, the technologies described herein do not require the use of a third-party application (broker) executing on the mobile computing device. Second, as the technologies described herein do not require the use of a shared authorization subsystem, inter-application communication may be achieved between mobile applications using different security schemes. Third, the technologies described above do not expose patient data to an operating system of the mobile computing device.

Figure 4:
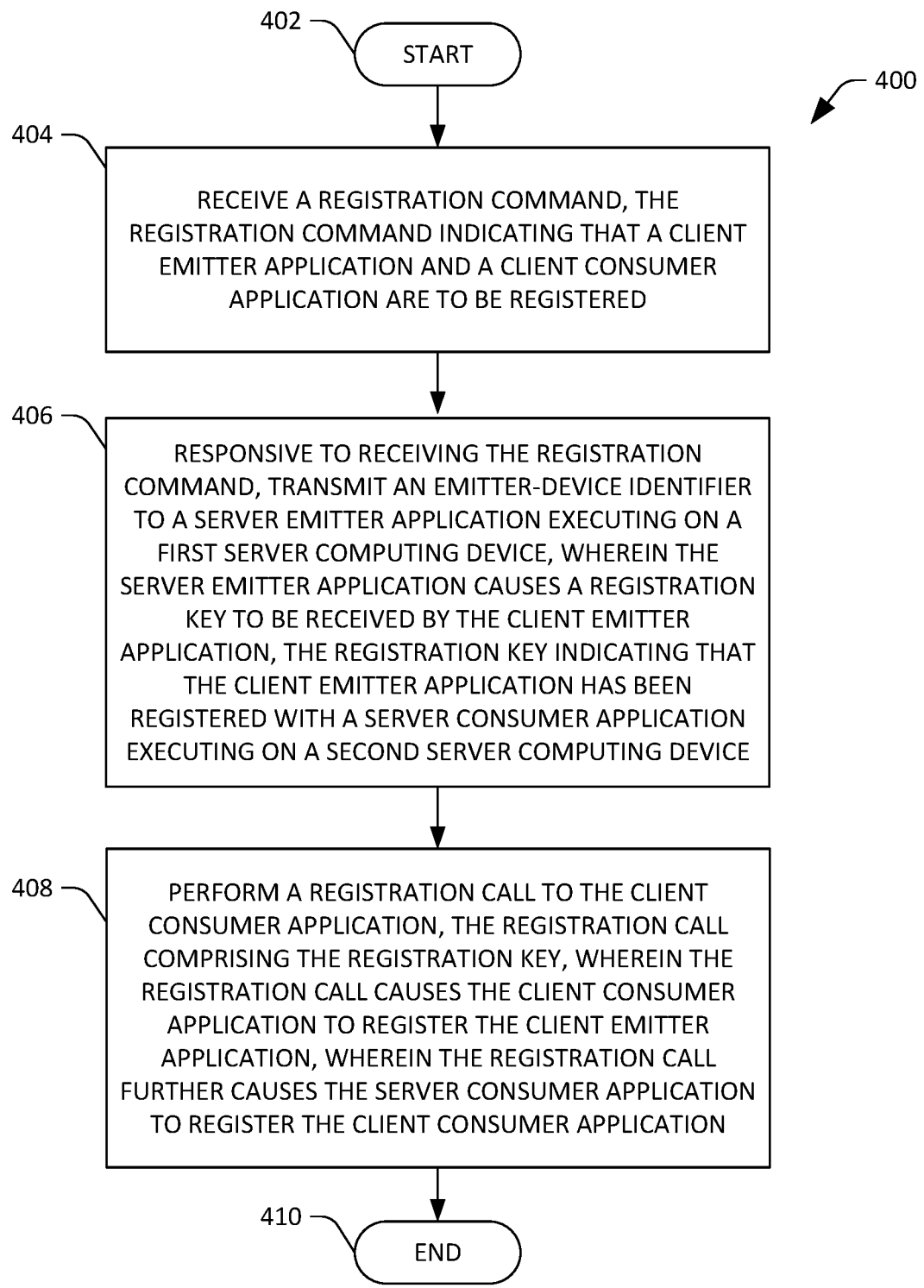
FIG. 4 is a flow diagram illustrating an exemplary methodology executed by a client emitter application that registers the client emitter application and a client consumer application for inter-application communication.
Figure 5:
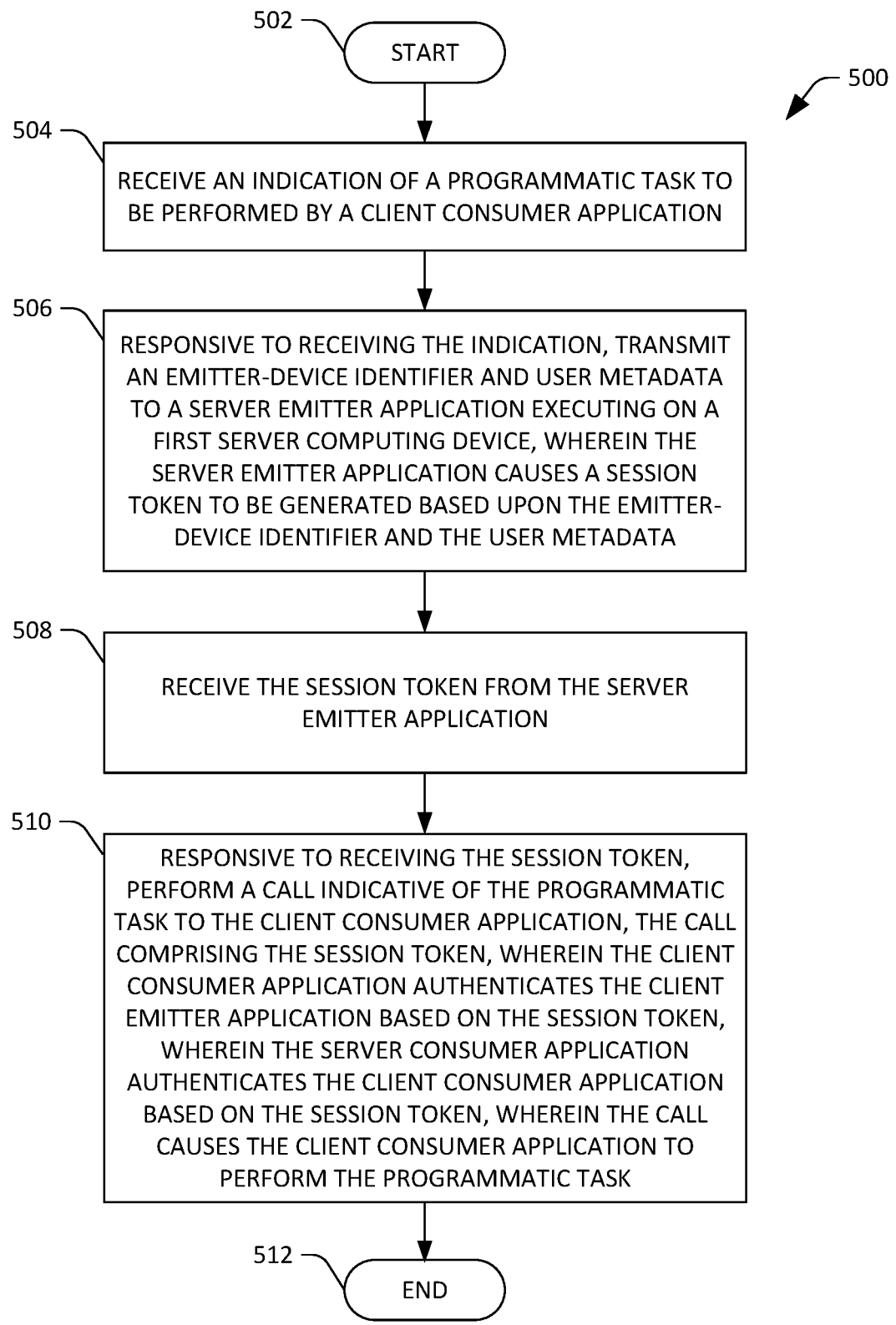
FIG. 5 is a flow diagram illustrating an exemplary methodology executed by a client emitter application that facilitates inter-application communication between the client emitter application and a client consumer application.

FIGS. 4 and 5 illustrate exemplary methodologies relating to inter-application communication. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 4, a methodology 400 performed by a client emitter application executing on a mobile computing device that registers the client emitter application and a client consumer application for inter-application communication on the mobile computing device is illustrated. The methodology 400 begins at 402, and at 404 the client emitter application receives a registration command indicating that the client emitter application and the client consumer application are to be registered. At 406, responsive to receiving the registration command, the client emitter application transmits an emitter-device identifier to a server emitter application executing on a first server computing device that is in network communication with the mobile computing device, wherein the emitter-device identifier identifies the mobile computing device executing the client emitter application. The server emitter application causes a registration key to be received by the client emitter application. The registration key indicates that the client emitter application has been registered with a server consumer application executing on a second server computing device that is in network communication with the mobile computing device and the first server computing device.

At 408, responsive to receiving the registration key, the client emitter application performs a registration call to the client consumer application. The registration call comprises the registration key and causes the client consumer application to register the client emitter application. The registration call also causes the server consumer application to register the client consumer application. The methodology 400 concludes at 410.

With reference now to FIG. 5, a methodology 500 performed by a client emitter application executing on a mobile computing device that facilitates inter-application communication is illustrated. The methodology 500 begins at 502, and at 504 the client emitter application receives an indication of a programmatic task to be performed by a client consumer application also executing on the mobile computing device. At 506, responsive to receiving the indication, the client emitter application transmits an emitter-device identifier and user metadata to a server emitter application executing on a first server computing device that is in network communication with the mobile computing device. The server emitter application causes a session token to be generated based upon the emitter-device identifier and the user metadata. The session token indicates that the client emitter application has been authenticated by a server consumer application executing on a second server computing device that is in network communication with the mobile computing device and the first server computing device. Furthermore, the server emitter application causes the session token to be received by the client emitter application.

At 508, the client emitter application receives the session token from the server emitter application. At 510, responsive to receiving the session token, the client emitter application performs a call indicative of the programmatic task to the client consumer application. The call comprises the session token. The call causes the client consumer application to authenticate the client emitter application based upon the session token. Additionally, the call causes the server consumer application to authenticate the client consumer application based upon the session token. Responsive to authentication of the client emitter application by the client consumer application and the authentication of the client consumer application by the server consumer application, the client consumer application performs the programmatic task. The methodology 500 concludes at 512.

Figure 6:
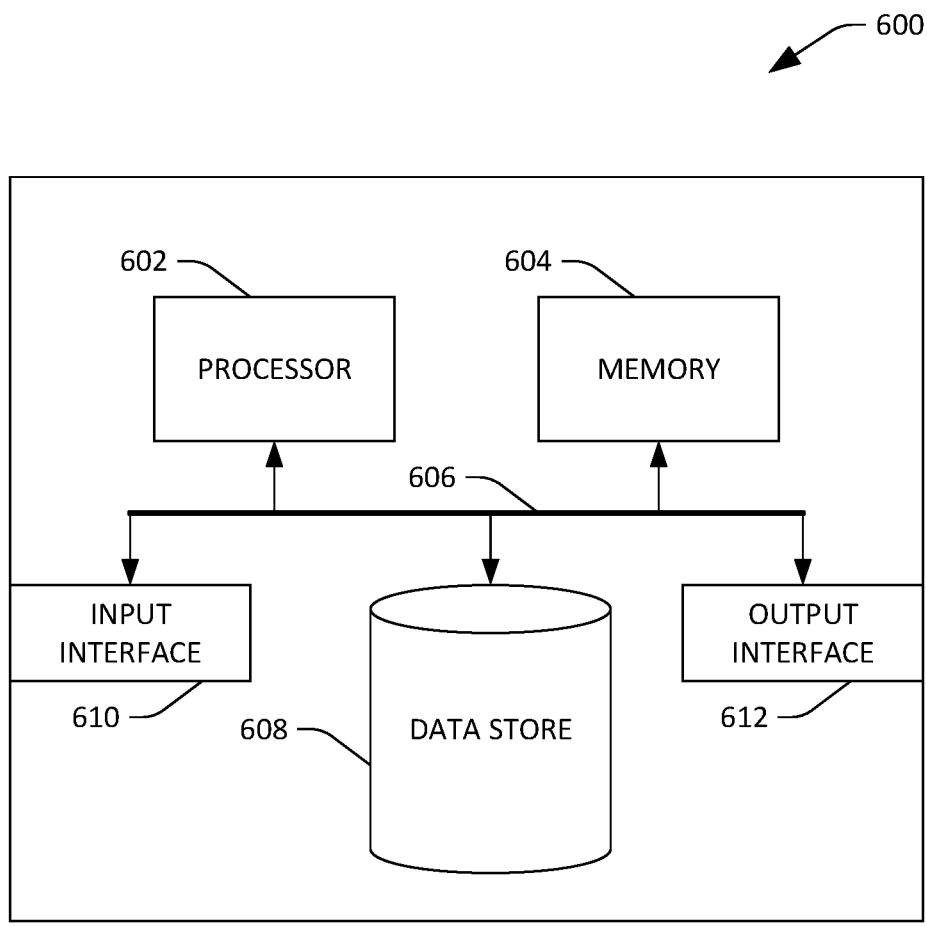
FIG. 6 is a schematic of an exemplary computing system.

Referring now to FIG. 6, a high-level illustration of an exemplary computing device 600 that can be used in accordance with the systems and methodologies disclosed herein is illustrated. For instance, the computing device 600 may be used in a system that registers a client emitter application and a client consumer application. By way of another example, the computing device 600 can be used in a system that facilitates inter-application communication between a client emitter application and a client consumer application. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store data for patients, tokens, etc.

The computing device 600 additionally includes a data store 608 that is accessible by the processor 602 by way of the system bus 606. The data store 608 may include executable instructions, data for patients, tokens, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A mobile computing device comprising:
a processor; and
memory storing a client emitter application and a client consumer application, wherein the client emitter application has previously provided an emitter-application identifier to the client consumer application, wherein the emitter-application identifier identifies the client emitter application, wherein the client emitter application has been registered with the client consumer application based upon the emitter-application identifier, wherein the client emitter application, when executed by the processor, causes the processor to perform acts comprising:
responsive to receiving an indication of a programmatic task performed by the client consumer application, transmitting, to a server emitter application executing on a first server computing device that is in network communication with the mobile computing device:
an emitter-device identifier, wherein the emitter-device identifier identifies the mobile computing device executing the client emitter application;
user metadata, wherein the user metadata identifies a user of the mobile computing device in an organization; and
patient data for a patient,
wherein the emitter-device identifier and the user metadata are transmitted by the server emitter application to a server consumer application executing on a second server computing device that is in network communication with the first server computing device and the mobile computing device, wherein the server consumer application authenticates the client emitter application based upon the emitter-device identifier and the user metadata, wherein the server consumer application generates a session token based on the emitter-device identifier and the user metadata indicating that the client emitter application has been authenticated by the server consumer application, wherein the session token is received by the client emitter application from the server emitter application; and
responsive to the client emitter application receiving the session token, performing a call indicative of the programmatic task to the client consumer application, the call comprising the session token and the patient data, wherein the client emitter application is authenticated by the client consumer application based on the session token, wherein the client consumer application is authenticated by the server consumer application based on the session token, and further wherein the call causes the client consumer application to perform the programmatic task using the patient data.

2. The mobile computing device of claim 1, the acts further comprising:
prior to receiving the indication of the programmatic task performed by the client consumer application, transmitting a callback indicative of a second programmatic task to the server emitter application, wherein the server emitter application causes the callback to be stored in a secure memory location on the mobile computing device, wherein the second programmatic task is performed by the client consumer application subsequent to the programmatic task being performed by the client consumer application.

3. The mobile computing device of claim 1, the acts further comprising:
prior to receiving the indication of the programmatic task performed by the client consumer application, transmitting the emitter-device identifier to the server emitter application, wherein the emitter-application identifier is retrieved by the server emitter application from a third server computing device that is configured to retain identifiers for applications that are able to be installed on mobile computing devices, wherein the server emitter application stores the user metadata, the emitter-device identifier, and the emitter-application identifier in a data store accessible to the server consumer application, wherein the server emitter application causes the client emitter application to receive a registration key, the registration key indicating that the client emitter application has registered with the server consumer application, the registration key comprising:
the emitter-application identifier; and
an encrypted emitter-application identifier,
wherein the encrypted emitter-application identifier is generated by the server consumer application by encrypting the emitter-application identifier.

4. The mobile computing device of claim 3, the acts further comprising:
responsive to receiving the registration key, transmitting the registration key to the client consumer application, wherein the client emitter application is registered by the client consumer application based upon the registration key, wherein the registration key and a consumer-device identifier are transmitted by the client consumer application to the server consumer application, the consumer-device identifier identifying the mobile computing device executing the client consumer application, wherein the registration key is verified by the server consumer application, wherein a salt is generated by the server consumer application and wherein the salt and the consumer-device identifier are stored in the data store, wherein secret data is generated by the server consumer application via a cryptographic function, the secret data comprising encrypted versions of:
the user metadata;
the emitter-device identifier;
the emitter-application identifier;
the salt; and
the consumer-device identifier,
wherein the server consumer application causes the client consumer application to store the secret data in a secure memory location on the mobile computing device accessible to the client consumer application, wherein the secret data is indexed by the emitter-application identifier.

5. The mobile computing device of claim 4, wherein an emitter token is received by server emitter application from a shared authorization subsystem, the emitter token indicating that the shared authorization subsystem has authenticated the client emitter application, and further wherein the server emitter application causes the server consumer application to generate the session token based upon the emitter token.

6. The mobile computing device of claim 5, wherein the emitter token is validated by the server consumer application using the user metadata and the shared authorization subsystem, and further wherein the server consumer application generates the session token upon validating the emitter token.

7. The mobile computing device of claim 4, wherein the user metadata, the emitter-device identifier, and the emitter-application identifier are transmitted by the server emitter application to the server consumer application, wherein the emitter-device identifier and the emitter-application identifier are validated, by the server consumer application, against the emitter-device identifier and the emitter-application identifier stored in the data store, and further wherein the server emitter application causes the server consumer application to generate the session token.

8. The mobile computing device of claim 7, wherein the secret data is regenerated by the server consumer application, wherein the session token is generated by the server consumer application, wherein a portion of the session token is encrypted by the server consumer application using the secret data, the session token comprising:
the emitter-application identifier; and
an encrypted emitter-application identifier,
wherein the session token is transmitted by the server consumer application to the server emitter application, and further wherein the session token is transmitted by the server emitter application to the client emitter application.

9. The mobile computing device of claim 8, wherein the emitter-application identifier in the session token is validated by the client consumer application, wherein the secret data stored in the secure memory location is retrieved by the client consumer application using the emitter-application identifier in the session token, wherein a decrypted session token is generated by the client consumer application by decrypting the encrypted emitter-application identifier in the session token using the secret data, wherein the decrypted session token, the emitter-device identifier, and the consumer-device identifier are transmitted by the client consumer application to the server consumer application.

10. The mobile computing device of claim 9, wherein the decrypted session token, the emitter-device identifier, and the consumer-device identifier are received by the server consumer application from the client consumer application, wherein a session access token is generated by the server consumer application using the decrypted session token, the emitter-device identifier, and the consumer-device identifier, wherein the session access token indicates that the client emitter application and the client consumer application have been authenticated by the server consumer application, and further wherein the session access token is transmitted by the server consumer application to the client consumer application.

11. The mobile computing device of claim 10, wherein the programmatic task is performed by the client consumer application responsive to the client consumer application receiving the session access token.

12. A method performed by a client emitter application being executed by a processor of a mobile computing device, the client emitter application stored in memory of the mobile computing device, the method comprising:
receiving an indication of a programmatic task performed by a client consumer application also stored in the memory and executed by the processor, the client emitter application has previously registered with the client consumer application based upon an emitter-application identifier that identifies the client emitter application, wherein the client emitter application has provided the emitter-application identifier to the client consumer application;
responsive to receiving the indication of the programmatic task, transmitting, to a server emitter application executing on a first server computing device that is in network communication with the mobile computing device:
an emitter-device identifier, wherein the emitter-device identifier identifies the mobile computing device executing the client emitter application;
user metadata, wherein the user metadata identifies a user of the mobile computing device in an organization; and
patient data for a patient,
wherein the emitter-device identifier and the user metadata are transmitted by the server emitter application to a server consumer application executing on a second server computing device that is in network communication with the first server computing device and the mobile computing device, wherein the server consumer application authenticates the client emitter application based upon the emitter-de vice identifier and the user metadata, wherein the server consumer application generates a session token indicating that the client emitter application has been authenticated by the server consumer application, wherein the session token is received by the client emitter application from the server emitter application;
receiving the session token from the server emitter application; and
responsive to receiving the session token, performing a call indicative of the programmatic task to the client consumer application, the call comprising the session token and the patient data, wherein the client emitter application is authenticated by the client consumer application based on the session token, wherein the client consumer application is authenticated by the server consumer application based on the session token, and further wherein the call causes the client consumer application to perform the programmatic task using the patient data.

13. The method of claim 12, further comprising:
prior to receiving the indication of the programmatic task performed by the client consumer application, transmitting a callback indicative of a second programmatic task to the server emitter application, wherein the server emitter application causes the callback to be stored in a secure memory location on the mobile computing device, wherein the second programmatic task is performed by the client consumer application subsequent to the programmatic task being performed by the client consumer application.

14. The method of claim 12, further comprising:
prior to receiving the indication of the programmatic task performed by the client consumer application, transmitting the emitter-device identifier to the server emitter application, wherein the emitter-application identifier is retrieved by the server emitter application from a third server computing device that is configured to retain identifiers for applications that are able to be installed on mobile computing devices, wherein the server emitter application s tore s the user metadata, the emitter-device identifier, and the emitter-application identifier in a data store accessible to the server consumer application, wherein the server emitter application causes the client emitter application to receive a registration key, the registration key indicating that the client emitter application has registered with the server consumer application, the registration key comprising:
the emitter-application identifier; and
an encrypted emitter-application identifier, wherein the encrypted emitter-application identifier is generated by the server consumer application by encrypting the emitter-application identifier.

15. The method of claim 14, further comprising:
responsive to receiving the registration key, transmitting the registration key to the client consumer application, wherein the client emitter application is validated by the client consumer application based upon the registration key, wherein the registration key and a consumer-device identifier are transmitted by the client consumer application to the server consumer application, the consumer-device identifier identifying the mobile computing device executing the client consumer application, wherein a salt is generated by the server consumer application and wherein the salt and the consumer-device identifier are stored in the data store, wherein secret data is caused, by the server consumer application, to be generated via a cryptographic function, the secret data comprising encrypted versions of:
the user metadata;
the emitter-device identifier;
the emitter-application identifier;
the salt; and
the consumer-device identifier,
wherein the server consumer application causes the client consumer application to store the secret data in a secure memory location on the mobile computing device accessible to the client consumer application, wherein the secret data is indexed by the emitter-application identifier.

16. The method of claim 15, wherein the session token is generated in part by utilizing a local identity provider of the mobile computing device.

17. A non-transitory computer-readable storage medium comprising a client emitter application and a client consumer application, wherein the client emitter application has previously provided an emitter-application identifier to the client consumer application, wherein the emitter-application identifier identifies the client emitter application, wherein the client emitter application has been registered with the client consumer application based upon the emitter-application identifier, wherein the client emitter application, when executed by a processor of a mobile computing device, causes the processor to perform acts comprising:
responsive to receiving an indication of a programmatic task performed by the client consumer application, transmitting, to a server emitter application executing on a first server computing device that is in network communication with the mobile computing device:
an emitter-device identifier, wherein the emitter-device identifier identifies the mobile computing device executing the client emitter application;
user metadata, wherein the user metadata identifies a user of the mobile computing device in an organization; and
patient data for a patient,
wherein the emitter-device identifier and the user metadata are transmitted by the server emitter application to a server consumer application executing on a second server computing device that is in network communication with the first server computing device and the mobile computing device, wherein the server consumer application authenticates the client emitter application based upon the emitter-device identifier and the user metadata, wherein the server consumer application generates a session token based on the emitter-device identifier and the user metadata indicating that the client emitter application has been authenticated by the server consumer application, wherein the session token is received by the client emitter application from the server emitter application; and
responsive to the client emitter application receiving the session token, performing a call indicative of the programmatic task to the client consumer application, the call comprising the session token and the patient data, wherein the client emitter application is authenticated by the client consumer application based the session token, wherein the client consumer application is authenticated by the server consumer application based on the session token, and further wherein the call causes the client consumer application to perform the programmatic task using the patient data.

18. The non-transitory computer-readable storage medium of claim 17, the acts further comprising:
prior to receiving the indication of the programmatic task performed by the client consumer application, transmitting a callback indicative of a second programmatic task to the server emitter application, wherein the server emitter application causes the callback to be stored in a secure memory location on the mobile computing device, wherein the second programmatic task is performed by the client consumer application subsequent to performing the programmatic task being performed by the client consumer application.

* * * * *